United States Patent
Fang et al.

(10) Patent No.: US 9,279,391 B2
(45) Date of Patent: Mar. 8, 2016

(54) DUAL FUEL SYSTEM AND ENGINE SYSTEM OPERATING METHOD

(71) Applicant: Caterpillar Inc., Peoria, IL (US)

(72) Inventors: Dianqi Fang, Dunlap, IL (US); Daniel Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 318 days.

(21) Appl. No.: 13/868,339

(22) Filed: Apr. 23, 2013

(65) Prior Publication Data

US 2014/0311451 A1    Oct. 23, 2014

(51) Int. Cl.
| | |
|---|---|
| F02M 43/04 | (2006.01) |
| F02M 21/02 | (2006.01) |
| F02D 19/06 | (2006.01) |
| F02D 19/10 | (2006.01) |
| F02M 47/02 | (2006.01) |
| F02M 55/00 | (2006.01) |
| F02M 55/02 | (2006.01) |
| F02M 63/02 | (2006.01) |
| F02M 63/00 | (2006.01) |

(52) U.S. Cl.
CPC ....... *F02M 21/0284* (2013.01); *F02D 19/0621* (2013.01); *F02D 19/0647* (2013.01); *F02D 19/0694* (2013.01); *F02D 19/105* (2013.01); *F02M 21/0281* (2013.01); *F02M 43/04* (2013.01); *F02M 47/027* (2013.01); *F02M 55/002* (2013.01); *F02M 55/02* (2013.01); *F02M 63/0019* (2013.01); *F02M 63/0064* (2013.01); *F02M 63/0295* (2013.01); *F02M 2200/44* (2013.01); *Y02T 10/32* (2013.01); *Y02T 10/36* (2013.01)

(58) Field of Classification Search
CPC ... F02M 21/0284; F02M 43/00; F02M 43/02; F02M 43/04; F02M 55/002; F02M 55/022; F02D 19/0621; F02D 19/0647; F02D 19/0694
See application file for complete search history.

(56) References Cited

U.S. PATENT DOCUMENTS

| | | | |
|---|---|---|---|
| 5,379,740 A | 1/1995 | Moore et al. | |
| 5,816,224 A | 10/1998 | Welsh et al. | |
| 6,298,833 B1 | 10/2001 | Douville et al. | |
| 6,394,426 B1 | 5/2002 | Galka et al. | |
| 2007/0199539 A1* | 8/2007 | Lennox et al. | 123/304 |
| 2008/0103676 A1* | 5/2008 | Ancimer et al. | 701/103 |
| 2011/0011369 A1 | 1/2011 | Jaasma et al. | |
| 2012/0055448 A1* | 3/2012 | Kim et al. | 123/456 |
| 2012/0196236 A1 | 8/2012 | Deng | |

FOREIGN PATENT DOCUMENTS

WO    2009155684    12/2009

\* cited by examiner

*Primary Examiner* — Lindsay Low
*Assistant Examiner* — Jacob Amick
(74) *Attorney, Agent, or Firm* — Liell & McNeil Attorneys P.C.; John P. Wappel (57) ABSTRACT

A dual fuel system for an internal combustion engine includes a gaseous fuel subsystem and a liquid fuel subsystem. A plurality of fuel injectors each define a gaseous fuel passage fluidly connected to a gaseous fuel manifold of the gaseous fuel subsystem, a liquid fuel passage fluidly connected to a liquid fuel manifold of the liquid fuel subsystem, and a liquid fuel leak path from the liquid fuel passage to the gaseous fuel passage. A liquid fuel purging mechanism includes a drain conduit and at least one valve positioned fluidly between the drain conduit and the gaseous fuel manifold, and being adjustable to fluidly connect the drain conduit to the gaseous fuel manifold, to drain leaked liquid fuel to a low pressure outlet.

20 Claims, 7 Drawing Sheets

DUAL FUEL SYSTEM AND ENGINE SYSTEM OPERATING METHOD

TECHNICAL FIELD

The present disclosure relates generally to dual fuel systems for internal combustion engines, and more particularly to purging liquid fuel leaked into a gaseous fuel side of the system.

BACKGROUND

One relatively new class of engines seeks to utilize two different fuels to gain efficiencies associated with compression ignition combined with advantages associated with burning gaseous fuel such as natural gas. In particular, one type of dual fuel engine utilizes a small pilot injection quantity of liquid diesel fuel that is compression ignited to in turn ignite a much larger charge of natural gas fuel in each engine cylinder. In one strategy for this type of engine, both fuels are directly injected from a single fuel injector associated with each engine cylinder.

For instance, U.S. Pat. No. 7,627,416 appears to teach a dual fuel common rail system in which liquid diesel fuel and natural gas fuel are both injected from a single fuel injector associated with each engine cylinder. This reference recognizes there may be instances in which the engine will need to operate solely on liquid diesel fuel due to exhaustion of the natural gas fuel supply or possibly some fault in the natural gas portion of the system. Certain problems and challenges associated with liquid fuel only operation are neither recognized nor addressed, however.

SUMMARY

In one aspect, a dual fuel system for an internal combustion engine includes a gaseous fuel subsystem including a gaseous fuel supply, a gaseous fuel manifold fluidly connected to the gaseous fuel supply, and a gaseous fuel pressure control mechanism configured to supply gaseous fuel from the gaseous fuel supply to the gaseous fuel manifold at a medium fuel pressure. The system further includes a liquid fuel subsystem including a liquid fuel supply, a liquid fuel manifold fluidly connected to the liquid fuel supply, and liquid fuel pressure control mechanism configured to supply liquid fuel from the liquid fuel supply to the liquid fuel manifold at a range of higher fuel pressure. The system further includes a plurality of fuel injectors each defining a gaseous fuel passage fluidly connected to the gaseous fuel manifold, a liquid fuel passage fluidly connected to the liquid fuel manifold, and a liquid fuel leak path from the liquid fuel passage to the gaseous fuel passage. A liquid fuel purging mechanism is coupled with the gaseous fuel subsystem, and includes a drain conduit having a low pressure outlet, and at least one valve positioned fluidly between the drain conduit and the gaseous fuel manifold and being adjustable from a first configuration at which the drain conduit is fluidly blocked from the gaseous fuel manifold to a second configuration at which the drain conduit is fluidly connected to the gaseous fuel manifold, to drain leaked liquid fuel from the gaseous fuel manifold to the low pressure outlet.

In another aspect, a method operating a dual fuel internal combustion engine system includes leaking a liquid fuel from a liquid fuel passage into a gaseous fuel passage via a leak path in a fuel system for the internal combustion engine, responsive to a difference in pressure between the gaseous fuel passage and the liquid fuel passage. The method further includes conveying the leaked liquid fuel from the gaseous fuel passage into a fluidly connected gaseous fuel manifold in the fuel system. The method still further includes purging the leaked liquid fuel from the gaseous fuel manifold at least in part by opening a valve to fluidly connect the gaseous fuel manifold with a drain conduit, such that the leaked liquid fuel drains from the gaseous fuel manifold into the drain conduit responsive to a difference in pressure between the gaseous fuel manifold and the drain conduit.

DETAILED DESCRIPTION

Figure 1:
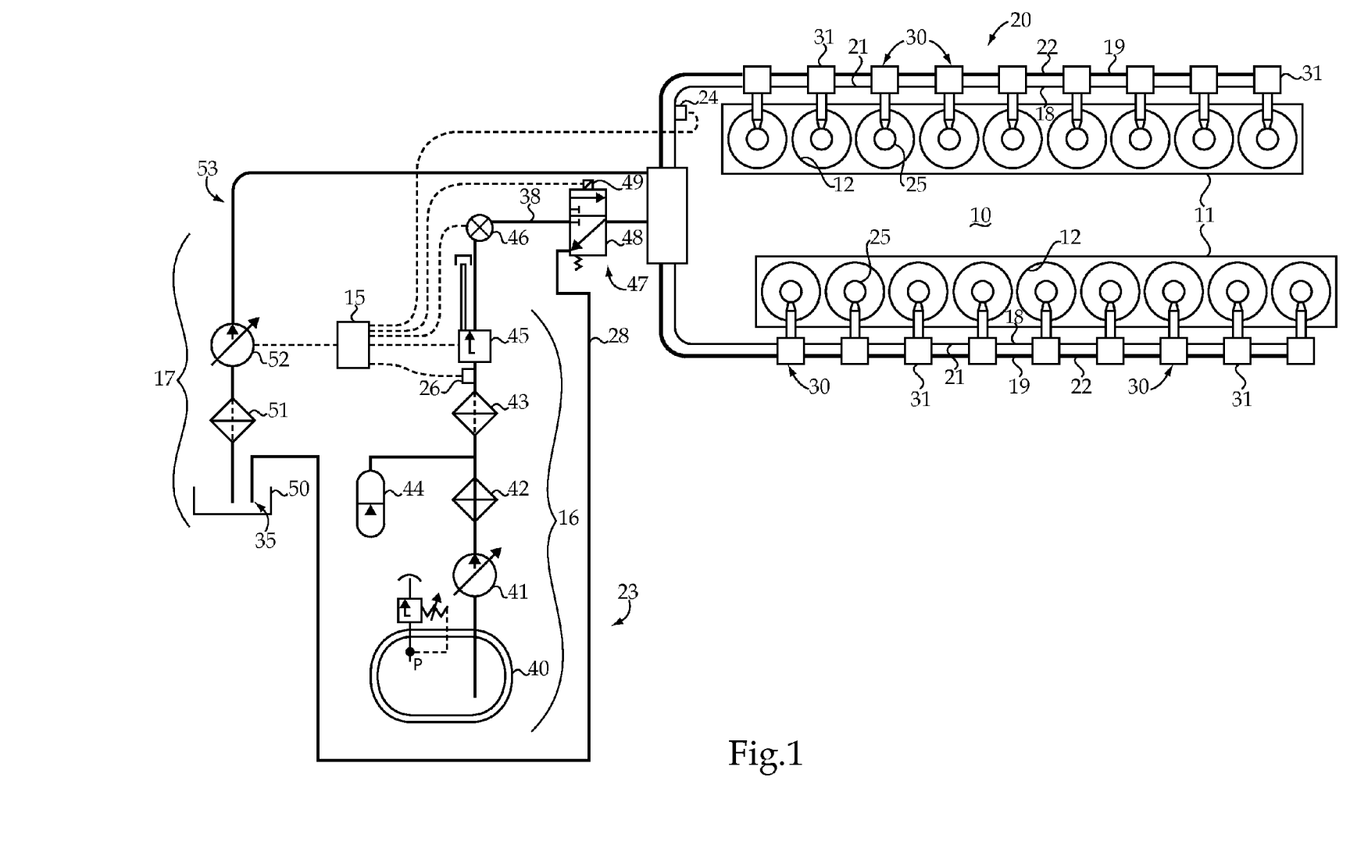
FIG. 1 is a schematic view of a dual fuel engine system according to the present disclosure.
Figure 2:
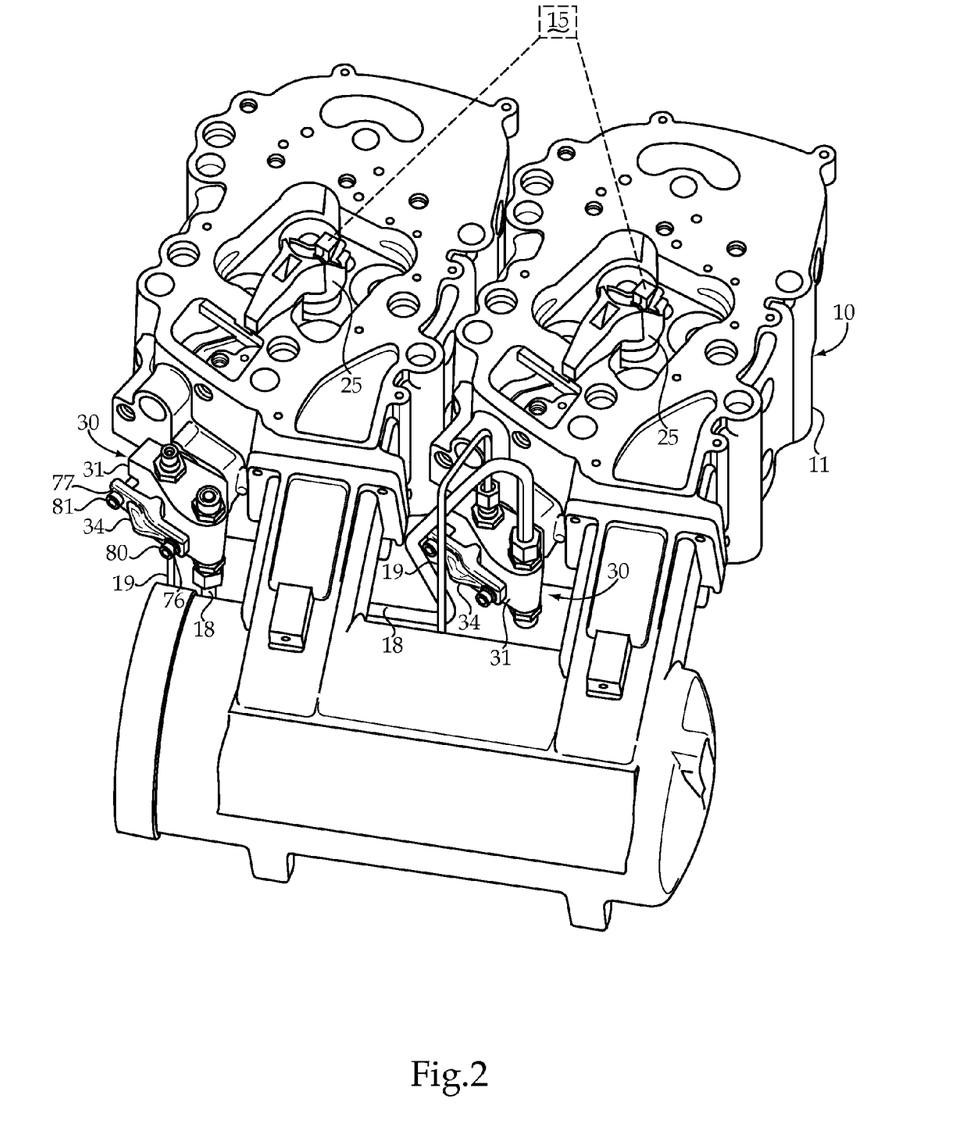
FIG. 2 is a perspective view of a portion of an engine and dual fuel system similar to that depicted in FIG. 1.
Figure 3:
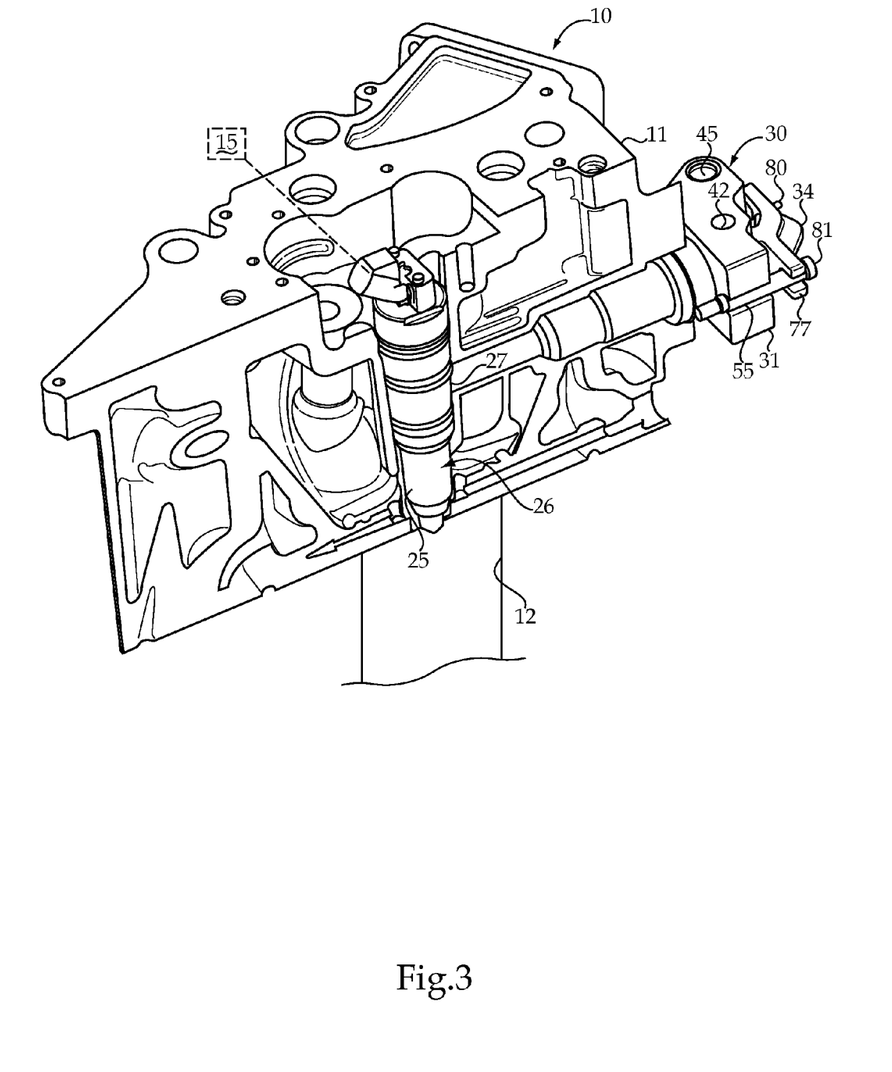
FIG. 3 is a sectioned view, in perspective, of a portion of the engine shown in FIG. 2 to reveal structure for one fuel injector and engine cylinder.

Referring initially to FIGS. 1-3, a dual fuel engine system 10 includes a dual fuel system 20 mounted to an engine housing 11 that defines a plurality of engine cylinders 12. The dual fuel system 20 may include exactly one fuel injector 25 positioned for direct injection into each of the plurality of engine cylinders 12. A gaseous fuel manifold 21 and a liquid fuel manifold 22 are fluidly connected to each fuel injector 25, and are parts of a gaseous fuel subsystem 23 and liquid fuel subsystem 53 of dual fuel system 20, respectively. The dual fuel system 20 also includes gas supply and pressure control mechanisms 16 as well as liquid supply and pressure control mechanisms 17, respectively fluidly connected to manifold 21 and manifold 22. A gaseous fuel conduit 38 fluidly connects mechanisms 16 to manifold 21 by way of a shutoff valve 46 further discussed herein. Each of fuel injectors 25, gas supply and pressure control mechanisms 16, and liquid supply and pressure control mechanisms 17 are in control communication with, and controlled by, an electronic engine control unit 15 in a known manner. The gas supply and pressure control mechanisms 16 may include a pressurized cryogenic liquefied natural gas supply or tank 40 with an outlet fluidly connected to a variable delivery cryogenic pump 41. Mechanisms 16 may also include a heat exchanger 42, an accumulator 44, a gas filter 43 and a fuel conditioning module 45 that controls the supply and pressure of gaseous fuel to gaseous fuel manifold 21.

Mechanisms 16 may supply gaseous fuel to manifold 21 at a medium fuel pressure relative to a supply pressure of liquid fuel. The liquid supply and pressure control mechanisms 17 may include a diesel fuel supply or tank 50, a fuel filter 51 and an electronically controlled high pressure fuel pump 52 that supply liquid fuel to, and control pressure in, liquid fuel manifold 22. Mechanisms 17 may supply liquid fuel to manifold 22 at a range of higher fuel pressures relative the medium supply pressure of gaseous fuel. Each of gaseous fuel pressure and liquid fuel pressure may be adjustable for reasons which will be understood by those skilled in the art, but in general liquid fuel pressures will be higher than gaseous fuel pressures at least within manifolds 21 and 22 in practical implementation strategies.

Figure 4:
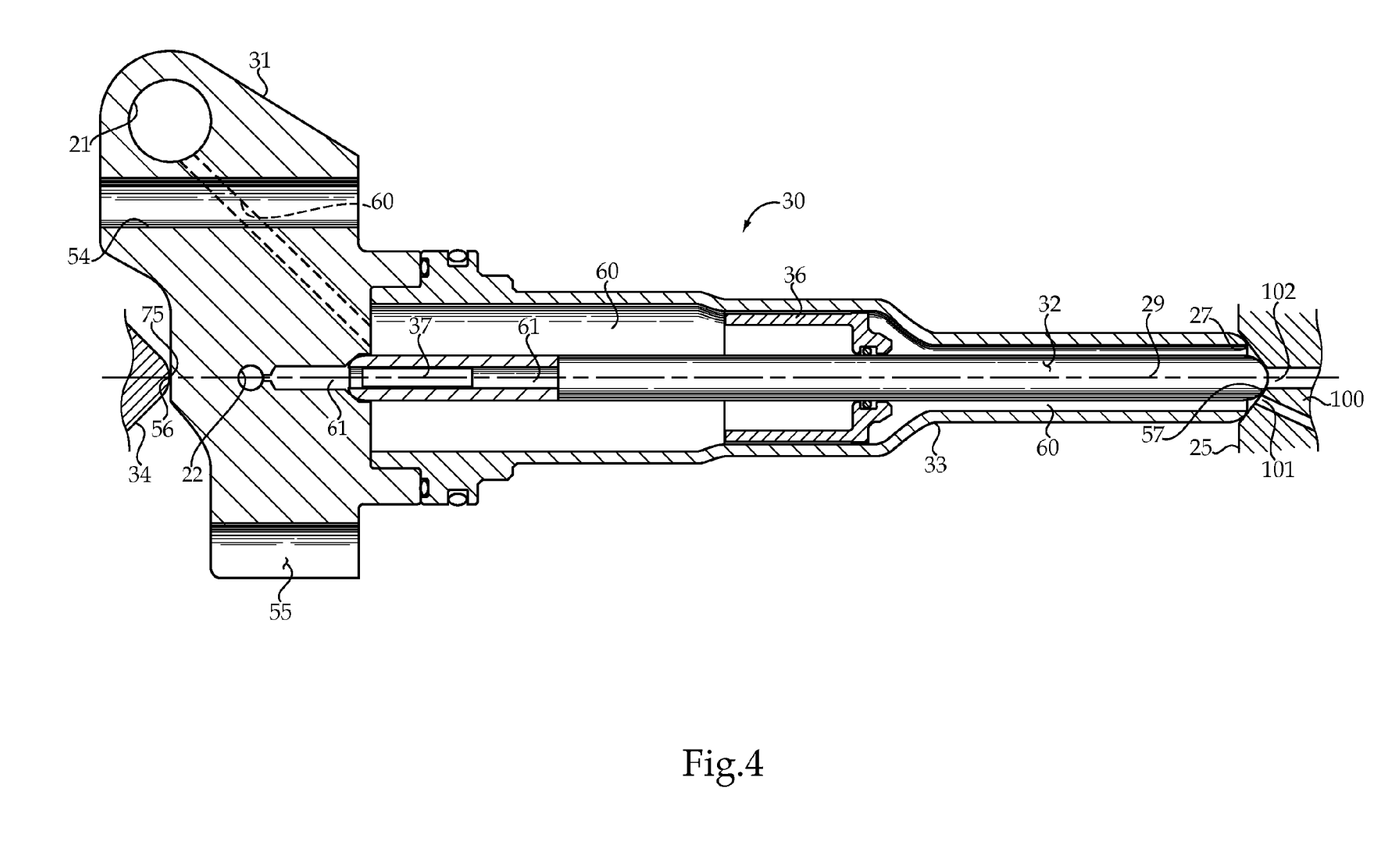
FIG. 4 is a sectioned side view through a co-axial quill connector assembly according to another aspect of the present disclosure.

Referring in addition to FIG. 4, dual fuel system 20 may include a coaxial quill connector 30 with an inner quill 32 defining an inner fuel passage 61 and an outer quill 33 defining an outer fuel passage 60, and having a tip in sealing contact with a common conical seat 27 of one of fuel injectors 25. Each of a plurality of similar or identical quill connectors 30 may be coupled one with each of fuel injectors 25. Blocks 31 of the coaxial quill connectors 30 may be daisy-chained together with gaseous fuel line segments 18 and liquid fuel line segments 19 to form gaseous fuel manifold 21 and liquid fuel manifold 22, respectively. Those skilled in the art will appreciate that manifolds 21 and 22 could be understood as, or understood to include, so-called common rails. The last coaxial quill connector 30 in the daisy-chain may have a set of plugs in place of the fittings shown in FIG. 2. A coaxial quill connector 30 is fluidly positioned between each of the plurality of fuel injectors 25 and each of gaseous fuel manifold 21 and liquid fuel manifold 22.

Each coaxial quill connector 30 may include a load adjusting clamp 34 with a pivot surface 75 in contact with a block 31 at a load adjustment location 56 that is intersected by an axis 29 of inner quill 32. Load adjusting clamp 34 may define a fastener slot 77 and a fastener bore 76 that receive a first fastener 81 and a second fastener 80, respectively. Load adjustment clamp 34 pivots on load adjustment location 56 responsive to adjustments to first and second fasteners 81, 80. Fasteners 80 and 81 are received in fastener bore 54 and fastener slot 55, respectively, of blocks 31.

Each block 31 of each co-axial quill connector 30 defines a segment of gaseous fuel manifold 21 that is oriented perpendicular to axis 29 of inner quill 32. Passage 60 opens at one end into gaseous fuel manifold 21 and opens at its other end into a first fuel inlet 101 of fuel injector 25. A segment of passage 60 is located between inner quill 32 and outer quill 33. Each of blocks 31 also defines a segment of liquid fuel manifold 22. Passage 61 opens at one end into liquid fuel manifold 22, and opens at its opposite end into a second fuel inlet 102 of fuel injector 25. Quill connector 30 forms a metal-to-metal seal 57 with injector body 100. Seal 57 separates passages 60 and 61, and also inlets 101 and 102, which are respectively connected to gaseous and liquid fuel passages within injector 25 as further described herein. Passages 60 and 61 will thus be understood to fluidly connect the liquid and gaseous fuel passages in fuel injector 25 with manifolds 22 and 21, respectively.

In order to trap metallic debris often liberated into the fuel flows during the first time operation of engine system 10 after being built, coaxial quill assembly 30 may include a gaseous fuel edge filter 36 and a liquid fuel edge filter 37. In the illustrated embodiment, liquid fuel edge filter 37 may be positioned in inner quill 32. Gaseous fuel edge filter 36 is shown positioned within outer quill 33. Those skilled in the art will appreciate that edge filters 36 and 37 could be located elsewhere, or omitted, without departing from the scope of this disclosure.

Figure 5:
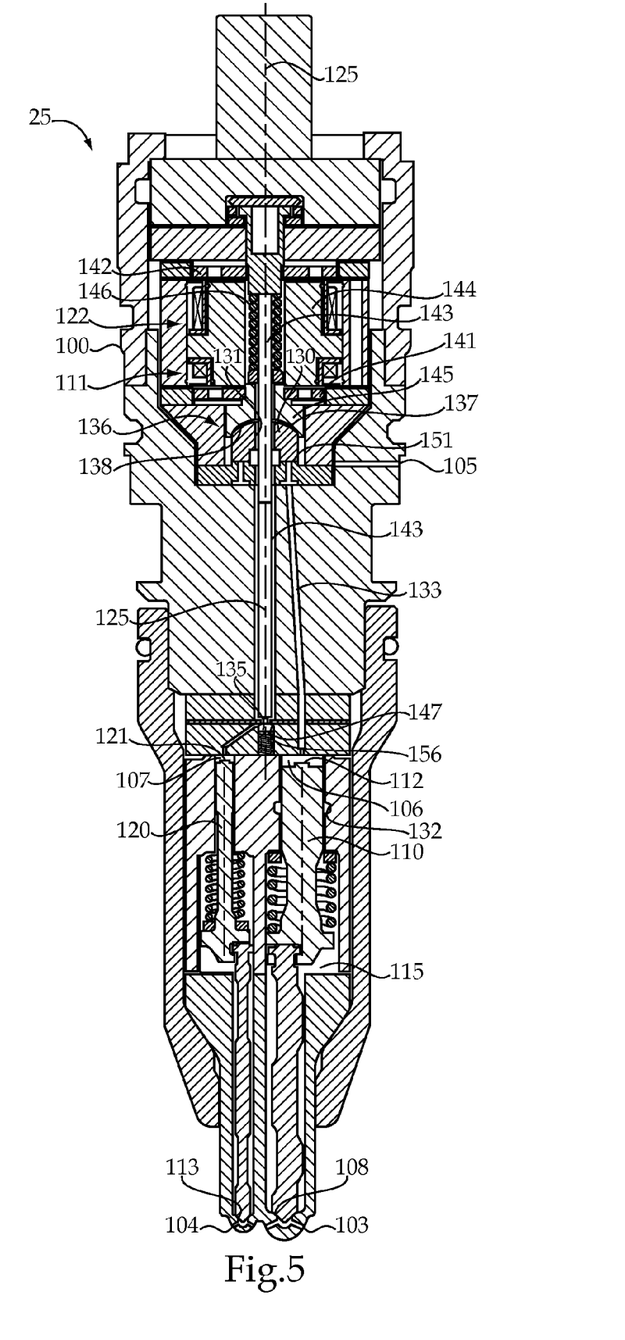
FIG. 5 is a sectioned front view of a fuel injector according to another aspect of the present disclosure.

Referring in addition to FIG. 5, a fuel injector 25 according to the present disclosure includes an injector body 100 that defines a gaseous fuel nozzle outlet or outlet set 103, a separate liquid fuel nozzle outlet or outlet set 104 and a drain outlet 105. Injector body 100 also defines first fuel inlet 101 and second fuel inlet 102 that can be seen in the sectioned view of FIG. 4 opening through common conical seat 27 of fuel injector 25. Disposed within injector body 100 are a first control chamber 106 and a second control chamber 107. A first check valve member or gaseous fuel outlet check 110 has a closing hydraulic surface 112 exposed to fluid pressure in first control chamber 106. First check valve member 110 is movable between a closed position, as shown, in contact with a first seat 108 to fluidly block fuel inlet 101 from nozzle outlet set 103, and an open position out of contact with first seat 108 to fluidly connect first fuel inlet 101 to first nozzle outlet set 103 via a gaseous fuel passage not visible in the sectioned view of FIG. 5. A second check valve member or liquid fuel outlet check 120 has a closing hydraulic surface 121 exposed to fluid pressure in second control chamber 107. Second check valve member 120 is movable between a closed position, as shown, in contact with a second seat 113 to fluidly block fuel inlet 102 from second nozzle outlet set 104, and an open position out of contact with second seat 113 to fluidly connect second fuel inlet 102 to second nozzle outlet set 104 via a liquid fuel passage not visible in the sectioned view of FIG. 5. Thus, injection of a first fuel (e.g., natural gas) through first nozzle outlet set 103 is facilitated by movement of first check valve member 110, while injection of a second fuel (e.g., liquid diesel) through second nozzle outlet set 104 is facilitated by movement of second check valve member 120. Those skilled in the art will appreciate that the first and second nozzle outlet sets 103, 104 might be expected to each include six nozzle outlets that are arranged around respective centerlines in a manner well known in the art. However, nozzle outlet sets 103 and 104 could each include as few as one nozzle outlet or any number of nozzle outlets in any arrangement without departing from the present disclosure. In still other embodiments, rather than side-by-side outlet checks, dual concentric check fuel injectors might be used.

A first control valve member 130 is positioned in injector body 100 and is movable along a common centerline 125 between a first position in contact with a flat seat 151 at which first control chamber 106 is fluidly blocked from drain outlet 105, and a second position at which first control chamber 106 is fluidly connected to drain outlet 105 via a control passage 133. When first control chamber 106 is fluidly connected to drain outlet 105, pressure in first control chamber 106 drops, relieving pressure on closing hydraulic surface 112 to allow first check valve member 110 to lift to facilitate an injection of the first fuel (e.g. natural gas) through first nozzle outlet set 103. A second control valve member 135 is positioned in injector body 100 and movable along the common centerline 125 between a first position in contact with flat seat 156 at which second control chamber 107 is fluidly blocked to drain outlet 105, and a second position out of contact with flat seat 156 at which second control chamber 107 is fluidly connected to drain outlet 105. When second control chamber 107 is fluidly connected to drain outlet 105, fluid pressure acting on closing hydraulic surface 121 is relieved to allow second check valve member 120 to lift to an open position to facilitate injection of the second fuel (e.g. liquid diesel) through second nozzle outlet set 104. Return of closing hydraulic pressure in control chambers 106 and 107 enables check valve members 110 and 120 to close.

In the illustrated embodiment, second control valve member 135 is intersected by common centerline 125, but first control valve member 130 defines a bore 131 therethrough that is concentric with common centerline 125. The respective control valve members 130, 135 may be moved to one of their respective first and second positions with first and second electrical actuators 111, 122, respectively. Control valve members 130, 135 may be biased to the other of their respective first and second positions by a spring(s) 146, 147. In particular, a first armature 141 may be attached to a pusher 145 in contact with first control valve member 130. First armature 141, pusher 145 and first control valve member 130 may be biased to the position shown, in contact with flat seat 151, by biasing spring 146. Control valve member 130 may rotate slightly about an axis perpendicular to common centerline 125 through the action of a self alignment feature 136 that allows a convex surface 137 to move on a concave bearing surface 138 each time control valve member 130 contacts flat seat 151. Thus, first armature 141 can be thought of as being operably coupled to move first control valve member 130, and a second armature 142 may be operably coupled to move second control valve member 135 by way of a plurality of pushers 143. A common stator 144 separates first armature 141 from second armature 142.

First control valve member 130 is in contact and out of contact with flat seat 151 at the first position and the second position, respectively. Likewise, second control valve member 135 is in contact and out of contact with flat seat 156 at its first position and second position, respectively. Either, one, or both of seats 151 and 156 may instead be a conical seat. First control valve member 130 may be coupled to move with first armature 141 responsive to de-energizing a lower coil mounted in common stator 144. When the lower coil mounted in common stator 144 is energized, armature 141 and pusher 145 are lifted upward allowing the high pressure in control passage 133 to push first control valve member 130 out of contact with flat seat 151 to fluidly connect control chamber 106 to drain outlet 105. First control chamber 106 and second control chamber 107 may always be fluidly connected to second fuel inlet 102 via passages not visible in the section view of FIG. 5. Thus, liquid diesel from second fuel inlet 102 may be utilized as the control fluid to control the operation of first check valve member 110 to facilitate gaseous fuel injection events and second member 120 to facilitate liquid fuel injection events.

A hydraulic lock seal 132 in the form of an annulus always fluidly connected to second fuel inlet 102 may be useful in inhibiting the migration of gaseous fuel from gaseous nozzle chamber 115 up into control chamber 106. Gaseous nozzle chamber 115 is always fluidly connected to first fuel inlet 101 via passages not visible in FIG. 5, and typically also thus fluidly connected to manifold 21. Referring specifically to FIGS. 4 and 5, the present disclosure teaches a strategy to inhibit liquid fuel from migrating from the respective fuel injectors 25 toward gaseous fuel common rail 21 under certain conditions, and also addressing such migration to the extent it does occur. When dual fuel system 20 is operating in a regular (gaseous fuel) mode, the liquid fuel manifold 22 may be maintained at a medium high pressure (e.g., maybe 40 MPa), and the gaseous fuel manifold 21 may be maintained at a medium low pressure (e.g., maybe 35 MPa). This slight pressure differential is intended to inhibit leakage of gaseous fuel into the liquid fuel portions of fuel injector 25 and hence the entire dual fuel system 20. The inclusion of hydraulic lock seal 132 is another feature to inhibit gaseous fuel from migrating into the liquid fuel side of dual fuel system 20. Nevertheless, one might expect some amount of leakage of liquid fuel into the gaseous fuel side of the system via a leak path formed past hydraulic lock seal 132 during regular mode of operation, but this small amount of leakage may be encouraged in order to facilitate proper lubrication of moving parts. For instance, a small amount of liquid diesel fuel may leak from hydraulic lock seal 132 down into gaseous nozzle chamber 115 during a regular mode of operation. One could expect this small amount of liquid diesel to be ejected from nozzle outlet set 103 with each gaseous injection event. This small amount of leaked liquid diesel may serve to help lubricate the guiding movement of first check valve member 110 and the seat 108 during regular mode of operation.

Dual fuel system 20 may also have a single fuel or liquid only mode of operation in which only liquid diesel fuel is utilized to power engine system 10. This mode of operation may be a "limp home" mode, and may only be preferable when there is some fault in the gaseous fuel system. In accordance with the present disclosure, a fault may include a malfunction of one or more of gas supply pressure and control mechanisms 16, a malfunction elsewhere in dual fuel system 20, or may simply relate to a lack of sufficient gaseous fuel to continue operating in the regular mode. Other liquid only modes may include a cold start operating mode, or a start after service mode, each representing a case where operation solely with liquid fuel is desirable or necessary. When operating in a liquid only mode, electronic control unit 15 may maintain liquid fuel manifold 22 at a high pressure (e.g., maybe 80 MPa), whereas the pressure in gaseous fuel manifold 21 may be allowed to decay. However, for reasons further discussed herein liquid fuel leakage into manifold 21 may actually raise its pressure above a rated pressure, and need to be addressed to prevent failure or undesired performance characteristics, particularly when switching back to gaseous fuel operation. Between or among the various operating modes manifold 22 will typically be maintained at or adjusted among a range of higher pressures, relative to a medium pressure or range of medium pressures for manifold 21. During the liquid only mode, engine 10 may be operated as a conventional diesel engine in which liquid diesel fuel is injected through nozzle outlet set 104 in sufficient quantities and at timings to compression ignite. On the other hand, during the regular mode of operation, one might expect a relatively small pilot diesel liquid injection through nozzle outlet set 104 to be compression ignited to in turn ignite a much larger charge of gaseous fuel injected through nozzle outlet set 103 to power engine system 10. Transitioning from normal to liquid only operation will thus typically entail increasing pressure in manifold 22 to accommodate increased liquid fueling demands. Due to the higher pressure differential between the liquid fuel and the gaseous fuel that exists during the liquid only mode of operation, one might expect more liquid fuel to leak into the gaseous side of dual fuel common rail system 20 than would leak during a regular mode of operation with a smaller pressure differential between the two fuels. Thus, system 20 may transition from a first liquid fuel leakage rate to a second, greater, liquid fuel leakage rate upon transitioning from regular to liquid fuel only mode. Inclusion of one or more check valves could also be used to prevent or slow build-up of leaked liquid diesel in gaseous nozzle chamber 115 from eventually reaching and entering gaseous fuel manifold 21. Failure, suboptimal or degraded performance of such check valves, or for instance failure of metal-to-metal seal 57 are all examples of instances where liquid fuel leakage into gaseous fuel subsystem 23 can be advantageously addressed by the present disclosure.

Referring back to FIG. 1, dual fuel system 20 may also include an electronically controlled isolation or shutoff valve 46 operably positioned between mechanisms 16 and gaseous fuel manifold 21. Valve 46 may be mechanically biased toward a closed position but movable to an open position responsive to a control signal from electronic control unit 15. When dual fuel system 20 is being operated in a regular mode, electronic control unit 15 may maintain valve 46 in an open position. However, in the event that the system transitions into a liquid only mode of operation, electronic control unit 15 may close valve 46, or allow valve 46 to close, to fluidly isolate mechanisms 16 from any leaked liquid fuel that may find its way into the gaseous side of dual fuel system 20, and in particular be conveyed in an upstream direction through connectors 30 and into manifold 21.

System 20 may also include a liquid fuel purging mechanism 47 coupled with gaseous fuel subsystem 23. Mechanism 47 may include a drain conduit 28 having a low pressure outlet 35, for example, fluidly connected to liquid fuel supply or tank 50. Outlet 35 may be at atmospheric pressure. Mechanism 47 may also include at least one valve 48 positioned fluidly between drain conduit 28 and gaseous fuel manifold 21. Valve 48, or a plurality of valves where employed, may be adjustable from a first configuration at which drain conduit 28 is fluidly blocked from manifold 21 to a second configuration at which drain conduit 28 is fluidly connected to manifold 21, to drain leaked liquid fuel from manifold 21 to low pressure outlet 35, henceforth returning the leaked liquid fuel back into supply 50. In such an embodiment, several additional features might be used to address concerns relating to conveying not only liquid fuel but at least some gaseous fuel back to supply 50. For instance, a fuel separator might be placed in drain conduit 28 or between conduit 28 and supply 50 to ensure only liquid fuel returns to supply 50. A fail-proof or redundant pressure relief mechanism might also be provided for supply 50 to enable evacuation of gaseous fuel. A spark arrestor, and/or pressure-assisted bottom feeding for filling supply 50 may also be desirable.

In a practical implementation strategy, valve 48 includes an electrically actuated valve having an electrical actuator 49 controlled via electronic control unit 15. Valve 48 may be a conventional two-way valve movable between a first position, at which gaseous fuel conduit 38 fluidly connects to manifold 21 and manifold 21 fluidly connects to drain conduit 28, and a second position, at which manifold 21 is fluidly blocked from drain conduit 28 and thus low pressure outlet 35. In an alternative embodiment, two valves might be used, with a first of the valves positioned within gaseous fuel conduit 38 and a second of the valves (similar to valve 48) positioned within drain conduit 28. In such an embodiment, the valve within drain conduit 28 would not continuously be exposed to fluid pressures of gaseous fuel subsystem 23, but only made available for controllably connecting manifold 21 to drain conduit 28 depending upon the state of the first valve. Another way to understand this alternative embodiment is that the valve within drain conduit 28 might comprise a pressure relief valve that only needs be exposed to fluid pressures in gaseous fuel subsystem 23 when shutoff valve 46 is closed. Electronic control unit 15 could be provided with suitable control logic to expose the second valve to fluid pressures of manifold 21, via opening the first valve, only when shutoff valve 16 is closed. The second valve could be a simple mechanical relief valve, having a pressure relief setting made lower than what would be required in the case of a valve directly in line with the gaseous fuel supply, such as in the FIG. 1 embodiment.

In a further practical implementation strategy, system 20 may further include a pressure sensor 24 exposed to a fluid pressure of gaseous fuel subsystem 23 at a location fluidly between gaseous fuel shutoff valve 46 and fuel injectors 25. Electronic control unit 15 may be configured to receive data from pressure sensor 24, and may be in control communication with valve 48 as noted above. Electronic control unit 15 may be further configured to command adjusting valve 48 from its first position to its second position, corresponding to the first and second configurations of mechanism 47, to establish the fluid connection between drain conduit 28 and gaseous fuel manifold 21, responsive to the data from pressure sensor 24. For instance, electronic control unit 15 may be monitoring pressure within gaseous fuel subsystem 23 via data received from pressure sensor 24, and can controllably actuate valve 48 to purge leaked liquid fuel from gaseous fuel subsystem 23, and in particular manifold 21, when it is determined that the leaked liquid fuel has raised pressures within subsystem 23 above a desired threshold. In an extension of this general strategy, additional data from pressure sensor 24 may be received by electronic control unit 15, and a decision made to close valve 48 once pressure has dropped down to an acceptable level in gaseous fuel subsystem 23.

As noted above, there are several different instances in which liquid fuel only operation may be desirable including limp home, cold start, start after service, or still another scenario. In cold start and start after service modes or in the case of clearing a gaseous fuel fault, it may subsequently become desirable to transition from the liquid only mode to a gaseous fuel mode. For electronic control unit 15 to determine whether conditions are suitable for transitioning from liquid fuel only mode to a gaseous fuel mode, it may be desirable to ensure that pressures in gaseous fuel subsystem 23 downstream of shutoff valve 46 are not equal to or higher than pressure upstream of shutoff valve 46. In other words, since transitioning to a gaseous fuel mode will require opening shutoff valve 46, if pressures in manifold 21 are too high, gaseous fuel will not flow into gaseous fuel conduit 38, and into manifold 21. Instead, gaseous fuel, and more importantly liquid fuel, on the downstream side of shutoff valve 46 would have a tendency to flow upstream into mechanisms 16, and potentially leading to the highly undesirable situation of liquid fuel entering accumulator 44 or others of mechanisms 16. To this end, system 20 may further include a second pressure sensor 26 exposed to a fluid pressure of gaseous fuel conduit 38 at a second location fluidly between shutoff valve 46 and accumulator 44. Electronic control unit 15 may be further configured to receive data from second pressure sensor 26, and to command adjusting valve 48 from its second position, at which manifold 21 is fluidly connected to conduit 28, back to its first position at which manifold 21 is fluidly blocked from conduit 28. Commanding the adjustment to valve 48 may occur responsive to data from both first pressure sensor 24 and second pressure sensor 26 indicative of a pressure drop from the first location upstream shutoff valve 46 to the second location downstream shut off valve 46.

The present disclosure thus recognizes that during liquid only mode of operation, leaked liquid fuel may tend to raise pressure in the gaseous fuel side of dual fuel system 20. For instance, the gaseous fuel side of dual fuel system 20 may be designed to tolerate a regular operating pressure (e.g., maybe 35 MPa), but be unable to reliably contain or be damaged by higher liquid fuel pressures (e.g., maybe 80 MPa or even higher) associated with liquid fuel subsystem 53 during liquid only mode of operation. It has further been observed that the large density difference between gaseous and liquid fuels can make transitioning from liquid only back to gaseous fuel operation more difficult due at least in part to the tendency for liquid fuel to fill certain regions of the gaseous side completely, if the liquid fuel is not purged. In order to prevent the gaseous fuel side of dual fuel system 20 from becoming overpressurized during a liquid only mode of operation, and to facilitate switching back to gaseous fuel operation leaked liquid fuel may be purged periodically in the general manner described herein, and in any case typically just prior to restoring a flow of gaseous fuel to manifold 21 via opening valve 48.

Figure 6:
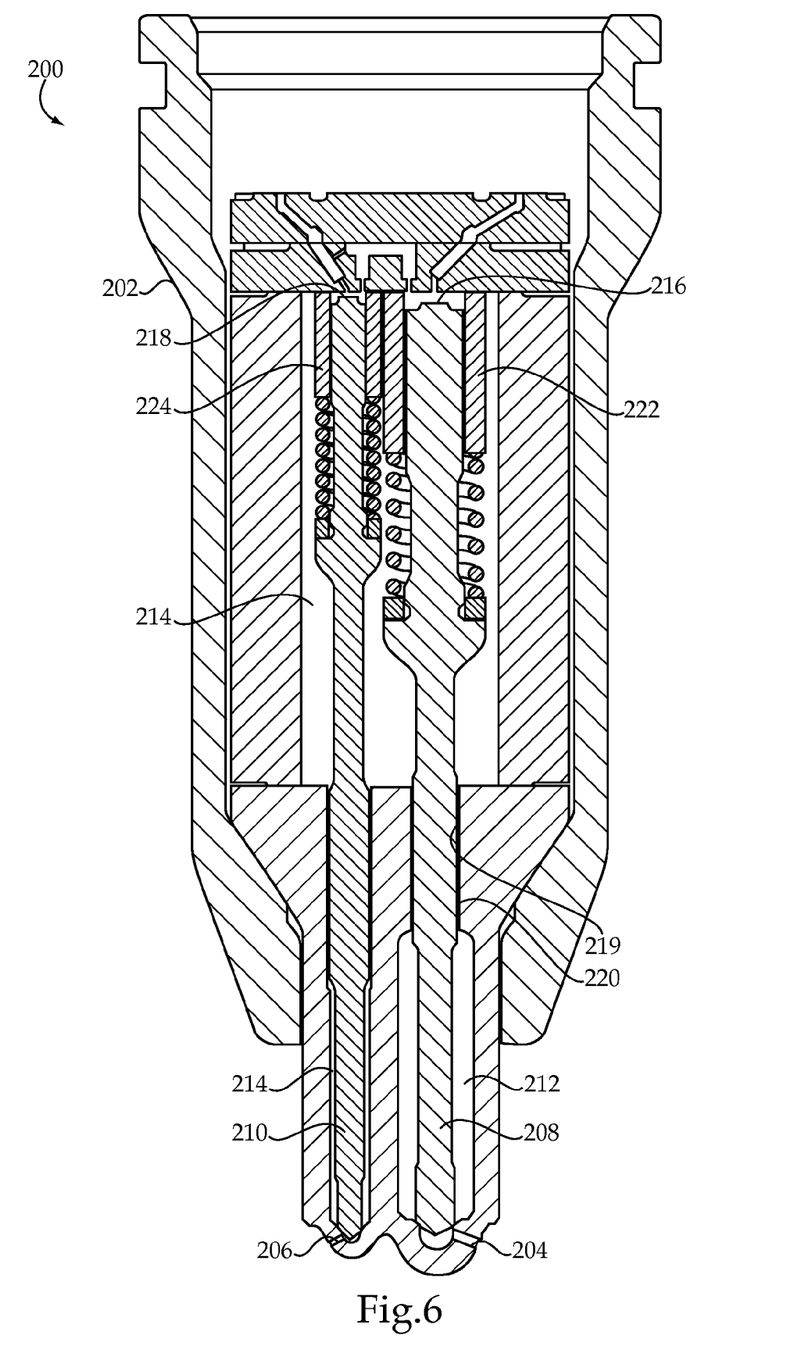
FIG. 6 is a sectioned view of a portion of a fuel injector according to still another aspect of the present disclosure.
Figure 7:
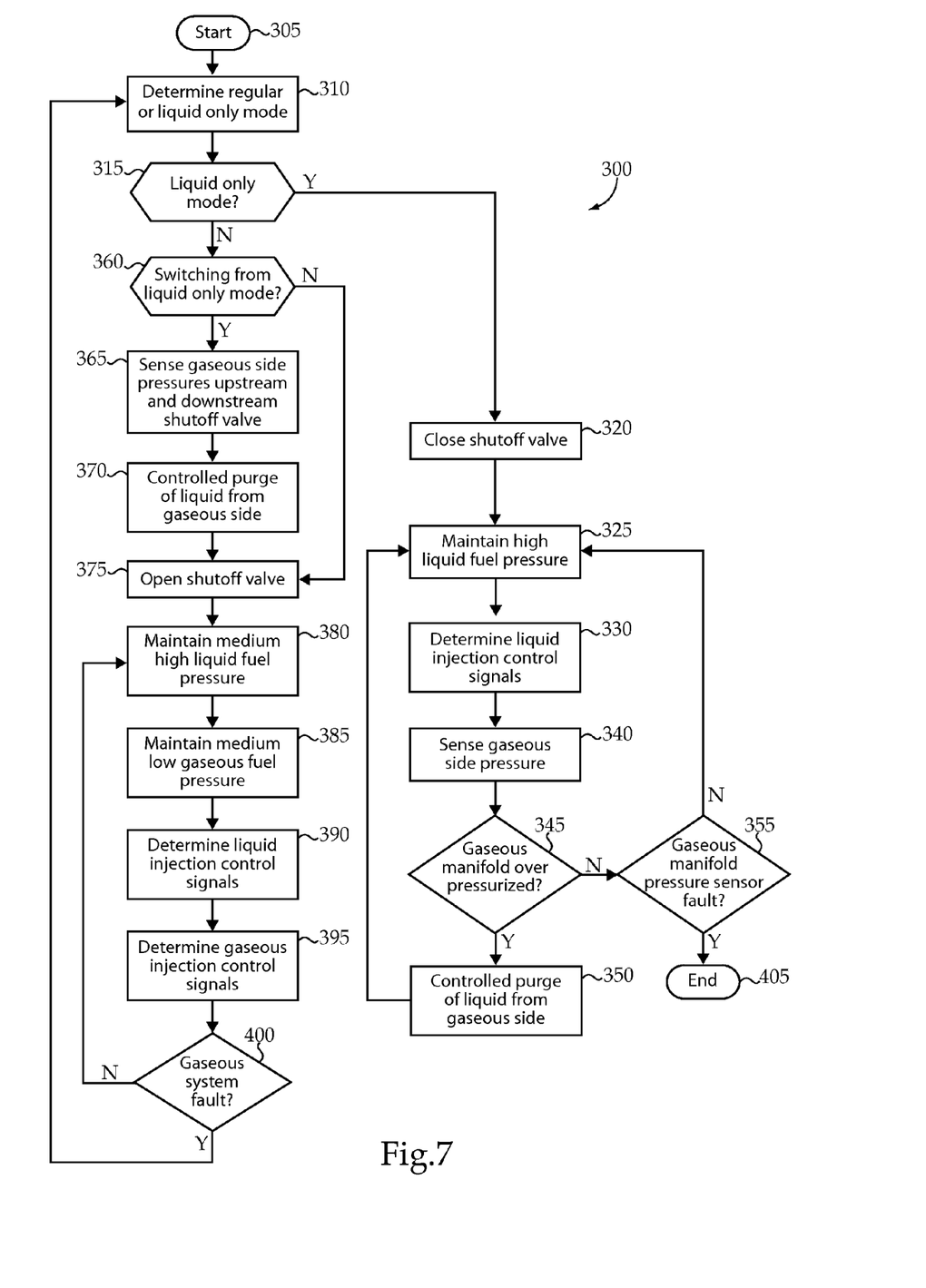
FIG. 7 is a logic flow diagram showing a method of engine system operation according to the present disclosure.

Referring now to FIG. 6, there is shown a portion of another fuel injector 200 according to an additional aspect of the present disclosure. Fuel injector 200 has a number of similarities with the fuel injectors previously described herein, but also has certain differences. Fuel injector 200 includes an injector body 202 having a gaseous fuel nozzle outlet 204 and a liquid fuel nozzle outlet 206. A gaseous fuel outlet check 208 and a liquid fuel outlet check 210 are each movable between a closed position blocking nozzle outlets 204 and 206, respectively, and an open position. Liquid fuel may be used as the control fluid for each of outlet checks 208 and 210. To this end, a first control chamber 216 is associated with outlet check 208, and a second control chamber 218 is associated with outlet check 210. Each of outlet checks 208 and 210 extends through a liquid fuel passage 214 supplying liquid fuel to outlet 206. Liquid fuel passage 214 is supplied with liquid fuel in a manner generally analogous to that described with regard to the foregoing embodiments. Injector body 202 also defines a gaseous fuel nozzle chamber forming a part of gaseous fuel passage 212 supplied with gaseous fuel also in a manner similar to foregoing embodiments. Accordingly, it will be understood that fuel injector 200 might be used in any of the contemplated embodiments herein, such that liquid fuel passage 214 is fluidly connected to liquid fuel manifold 22, and gaseous fuel passage 212 is fluidly connected to gaseous fuel manifold 21. A quill connector such as quill connector 30 discussed herein may be used to provide the respective fluid connections, and also form an unobstructed gaseous fuel passage leading in an upstream direction to manifold 21 through which leaked liquid fuel can be conveyed.

In the illustrated embodiment, outlet check 208 is positioned within a first sleeve 222 in part forming control chamber 216, and outlet check 210 is positioned within a second sleeve 224 forming in part control chamber 218. Sleeves 222 and 224 may be free floating. Each of outlet checks 208 and 210 may be guided via an interaction with injector body 202, and thus sleeves 222 and 224 may serve little or no guiding function, but merely serve to provide for the respective hydraulic fluid control volumes. In the case of outlet check 208, injector body 202 defines a guide bore 219, and outlet check 208 is movable within guide bore 219 and has a clearance 220 with guide bore 219 forming a liquid fuel leak path. In view of FIG. 6, it will thus be understood that clearance 220 provides a path whereby relatively higher pressure liquid fuel can travel from liquid fuel passage 214 to gaseous fuel passage 212, and can thenceforth be conveyed via the pressure of continuously leaking liquid fuel and/or the force of gravity in an upstream direction through gaseous fuel passage 212, the associated quill connector 30, and into gaseous fuel manifold 21. The structural aspects of fuel injector 200 not shown in FIG. 5 are generally known, as are the strategies for its control and operation.

INDUSTRIAL APPLICABILITY

Referring now in particular to FIG. 6, but also with reference to features of the present disclosure shown in other Figures, there is shown a flowchart 300 illustrating example fueling control logic executed by electronic control unit 15, according to the present disclosure. The logic starts at block 305, and advances to block 310 where electronic control unit 15 determines whether engine 10 and fuel system 20 are to be operated in a regular mode or a liquid only mode. At this point, engine system 10 may already be running, such that some liquid fuel is leaking into subsystem 23, with the leakage rate dependent upon whether present operation is regular or liquid only. If operation is to be in the liquid only mode, a query 315 will advance the logic to block 320 where electronic control unit 15 commands shutoff valve 46 be closed. From block 320, the logic may advance to block 325 at which electronic control unit 15 maintains a high liquid fuel pressure, for instance, controlling pump 52 to maintain or raise liquid fuel pressure to a fuel pressure suitable for liquid only operation, as the case may be. With shutoff valve 46 closed, gaseous fuel pressure in manifold 21 and elsewhere within gaseous fuel subsystem 23 downstream from shutoff valve 46 may begin to decay. As discussed herein, however, a pressure of liquid fuel, and in particular where liquid fuel pressure is elevated for liquid only operation, can cause an increase in a rate of leakage of the liquid fuel from a first rate of leakage in the gaseous fuel mode to a second rate of leakage in the liquid fuel only mode. In any event, liquid fuel may leak into gaseous fuel subsystem via the plurality of leak paths defined by the plurality of fuel injectors, or other leak paths in fuel system 20, responsive to a difference in pressure between gaseous and liquid fuel passages in system 20.

From block 325, the logic may advance to block 330 where electronic control unit 15 determines liquid injection control signals for fuel injectors 25 or any of the other fuel injectors contemplated herein. The logic may next advance to block 340 to sense gaseous side pressure, such as via receiving sensor data from sensor 24 at electronic control unit 15. From block 340, the logic may advance to query 345 where electronic control unit 15 determines whether manifold 21 is overpressurized, for instance, by comparing a sensed gaseous side pressure with some predetermined threshold. If no, the logic may advance to query 355 where electronic control unit 15 determines whether there is a gaseous manifold pressure sensor fault. If yes, the logic may advance to end at block 405. If yes, the logic may advance to block 350 to perform a controlled purge of liquid from the gaseous side. In the case of block 350, electronic control unit 15 may be understood as commanding opening valve 48 for a predetermined time, or until a predetermined pressure level as indicated via sensor 24 is observed. Alternatively or additionally, electronic control unit 15 might maintain valve 48 in a position fluidly connecting manifold 21 with drain conduit 28 until a predetermined pressure drop from mechanisms 16 to gaseous fuel conduit 38, and by implication manifold 21, is observed. In any case, at block 350, leaked liquid fuel is purged from manifold 21 via opening valve 48 to fluidly connect manifold 21 with drain conduit 28. Leaked liquid fuel drains into drain conduit 28 responsive to a difference in pressure between manifold 21 and conduit 28. Embodiments are contemplated as discussed above where purging the leaked liquid fuel includes returning the leaked liquid fuel to liquid fuel supply 50. From block 350, the logic may advance to block 325 again.

Where, at query 315, it is determined that the liquid only mode is not to be executed, the logic may advance to query 360 where electronic control unit 15 may determine whether system 20 is switching from liquid only mode. In other words, at query 360 electronic control unit 15 is determining whether system 20 is transitioning back to gaseous fuel mode from a liquid only mode. If no, the logic may advance to block 375. If, at query 360, system 20 is switching from liquid only mode, the logic may advance to block 365 to sense gaseous side pressures both upstream and downstream shutoff valve 46, for instance receiving data from sensor 24 and also receiving data from sensor 26. From block 365, the logic may advance to block 370 where electronic control unit 15 performs a controlled purge of liquid from the gaseous side. The controlled purge might occur closed loop until a desired pressure drop is observed. From block 370, the logic may advance to block 375 to open shutoff valve 46, enabling the supplying of gaseous fuel to gaseous fuel conduit 38 in preparation for injection via injectors 25. From block 375, the logic may advance to block 380 where electronic control unit 15 maintains a medium high liquid fuel pressure, and thenceforth or in parallel to block 385 where electronic control unit 15 maintains medium low gaseous fuel pressure. From block 385, the logic may advance to block 390 where electronic control unit 15 determines liquid injection control signals, and thenceforth or in parallel to block 395 where electronic control unit 15 determines gaseous injection control signals. From block 395, the logic may advance to query 400 where electronic control unit 15 determines whether there is a gaseous system fault. If no, the logic may return to block 380. If yes, the logic may return to block 310.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A dual fuel system for an internal combustion engine comprising:
    a gaseous fuel subsystem including a gaseous fuel supply, a gaseous fuel manifold fluidly connected to the gaseous fuel supply, and a gaseous fuel pressure control mechanism configured to supply gaseous fuel from the gaseous fuel supply to the gaseous fuel manifold at a medium fuel pressure;
    a liquid fuel subsystem including a liquid fuel supply, a liquid fuel manifold fluidly connected to the liquid fuel supply, and a liquid fuel pressure control mechanism configured to supply liquid fuel from the liquid fuel supply to the liquid fuel manifold at a range of higher fuel pressures;
    a plurality of fuel injectors each defining a gaseous fuel passage fluidly connected to the gaseous fuel manifold, a liquid fuel passage fluidly connected to the liquid fuel manifold, and a liquid fuel leak path from the liquid fuel passage to the gaseous fuel passage; and
    a liquid fuel purging mechanism coupled with the gaseous fuel subsystem located upstream of the gaseous fuel manifold, and including a drain conduit having a low pressure outlet, and at least one valve positioned fluidly between the drain conduit and the gaseous fuel manifold, the valve having a first port fluidly connected to the gaseous fuel supply, a second port fluidly connected to the gaseous fuel manifold, and a third port fluidly connected to the drain conduit and being adjustable from a first configuration at which the drain conduit is fluidly blocked from the gaseous fuel manifold to a second configuration at which the drain conduit is fluidly connected to the gaseous fuel manifold, to drain leaked liquid fuel from the gaseous fuel manifold to the low pressure outlet.

2. The system of claim 1 wherein each of the plurality of fuel injectors defines a first nozzle outlet and a separate second nozzle outlet fluidly connected to the corresponding gaseous and liquid fuel passages, respectively, and includes a first and a second outlet check each movable between a closed position blocking the first and second nozzle outlets, respectively, and an open position.

3. The system of claim 2 wherein each of the fuel injectors includes an injector body defining a guide bore, and the first outlet check is movable within the guide bore and has a clearance with the guide bore forming the liquid fuel leak path.

4. The system of claim 2 further comprising a plurality of coaxial quill connectors each defining an inner fuel passage fluidly connecting the liquid fuel passage in one of the plurality of fuel injectors with the liquid fuel manifold, and an outer fuel passage fluidly connecting the gaseous fuel passage in the one of the plurality of fuel injectors with the gaseous fuel manifold.

5. The system of claim 4 wherein each of the plurality of coaxial quill connectors includes a tip forming a metal-to-metal seal with the corresponding one of the plurality of fuel injectors fluidly separating the inner and outer fuel passages in the quill connector and the gaseous fuel and liquid fuel passages in the one of the fuel injectors.

6. The system of claim 1 wherein the low pressure outlet of the drain conduit is fluidly connected to the liquid fuel supply.

7. The system of claim 1 wherein the gaseous fuel subsystem further includes an accumulator fluidly connected to the gaseous fuel supply, a gaseous fuel conduit fluidly connecting the accumulator to the gaseous fuel manifold and a gaseous fuel shutoff valve located fluidly between the accumulator and the gaseous fuel manifold, and wherein the fluid connection between the drain conduit and the gaseous fuel manifold is located fluidly between the gaseous fuel shutoff valve and the plurality of fuel injectors.

8. The system of claim 7 further comprising a pressure sensor exposed to a fluid pressure of the gaseous fuel subsystem at a location fluidly between the gaseous fuel shutoff valve and the plurality of fuel injectors.

9. The system of claim 8 wherein the at least one valve includes an electrically actuated valve.

10. The system of claim 9 further comprising an electronic control unit configured to receive data from the pressure sensor and in control communication with the electrically actuated valve, and being further configured to command adjusting the electrically actuated valve from a first position to a second position to establish the fluid connection between the drain conduit and the gaseous fuel manifold, responsive to the data.

11. The system of claim 10 further comprising a second pressure sensor exposed to a fluid pressure of the gaseous fuel subsystem at a second location fluidly between the shutoff valve and the accumulator, and the electronic control unit being further configured to receive data from the second pressure sensor, and to command adjusting the electrically actuated valve from the second position to the first position to block the fluid connection between the drain conduit and the gaseous fuel manifold, responsive to data from the first and second pressure sensors indicative of a pressure drop from the first location to the second location.

12. A method of operating a dual fuel internal combustion engine system comprising the steps of:
    leaking a liquid fuel from a liquid fuel passage into a gaseous fuel passage via a leak path in a fuel system for the internal combustion engine, responsive to a difference in pressure between the gaseous fuel passage and the liquid fuel passage;
    conveying the leaked liquid fuel from the gaseous fuel passage into a fluidly connected gaseous fuel manifold in the fuel system; and
    purging the leaked liquid fuel from the gaseous fuel manifold at least in part by selectively operating a valve located upstream of the gaseous fuel manifold to fluidly isolate the gaseous fuel manifold from a gaseous fuel subsystem and to fluidly connect the gaseous fuel manifold with a drain conduit, such that that the leaked liquid fuel drains from the gaseous fuel manifold into the drain conduit responsive to a difference in pressure between the gaseous fuel manifold and the drain conduit.

13. The method of claim 12 wherein the step of purging further includes returning the leaked liquid fuel to a liquid fuel supply fluidly connected to a liquid fuel manifold in the fuel system.

14. The method of claim 13 further comprising a step of receiving data indicative of a fluid pressure in the gaseous fuel manifold, and wherein the step of purging further includes commanding opening of the valve responsive to the data.

15. The method of claim 12 wherein the step of leaking further includes leaking the liquid fuel via a plurality of liquid fuel leak paths defined by a plurality of fuel injectors of the fuel system, and wherein the step of purging further includes purging the leaked liquid fuel while gaseous fuel outlet checks of each of the plurality of fuel injectors are closed.

16. The method of claim 15 wherein the step of conveying further includes conveying the leaked liquid fuel in an upstream direction from the fuel injectors to the gaseous fuel manifold through a plurality of unobstructed gaseous fuel passages in a plurality of coaxial quill connectors each coupled with one of the plurality of fuel injectors.

17. The method of claim 15 wherein the step of leaking further includes leaking the liquid fuel through guide clearances of gaseous fuel outlet checks within each of the plurality of fuel injectors.

18. The method of claim 12 wherein the step of leaking further includes leaking the liquid fuel past a failed metal-to-metal seal in the fuel system.

19. The method of claim 12 further comprising a step of transitioning the internal combustion engine from a gaseous fuel mode to a liquid fuel only mode, and wherein the step of leaking further includes increasing a rate of leakage of the liquid fuel from a first rate of leakage in the gaseous fuel mode to a second rate of leakage in the liquid fuel only mode.

20. The method of claim 19 further comprising the steps of sensing a fluid pressure of the gaseous fuel manifold, and transitioning the internal combustion engine from the liquid fuel only mode back to the gaseous fuel mode, responsive to the sensed fluid pressure.

* * * * *